Feb. 19, 1952     J. M. ANDREWS     2,585,987
RELAY TYPE OF CURRENT LIMITER
Filed April 11, 1951     3 Sheets-Sheet 1

Inventor
John M. Andrews
By
Attorneys

Feb. 19, 1952     J. M. ANDREWS     2,585,987
RELAY TYPE OF CURRENT LIMITER
Filed April 11, 1951     3 Sheets-Sheet 2

Inventor
John M. Andrews
By Dodge and Imm
Attorneys

Feb. 19, 1952   J. M. ANDREWS   2,585,987
RELAY TYPE OF CURRENT LIMITER
Filed April 11, 1951   3 Sheets-Sheet 3
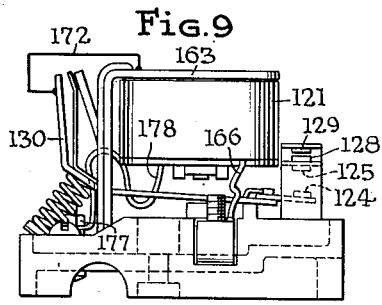
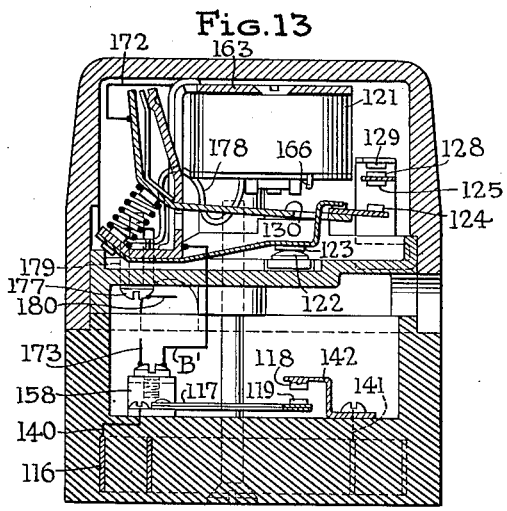
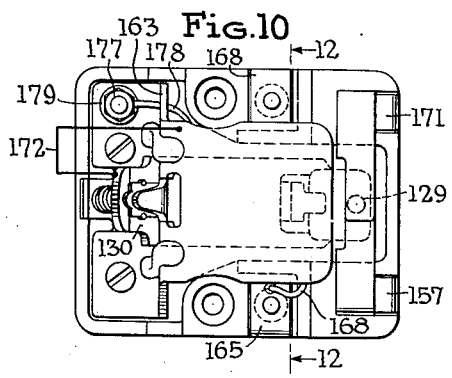
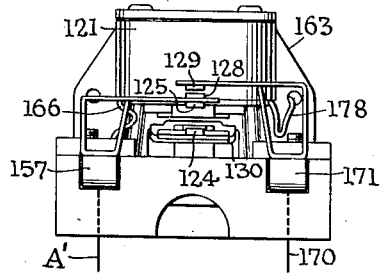
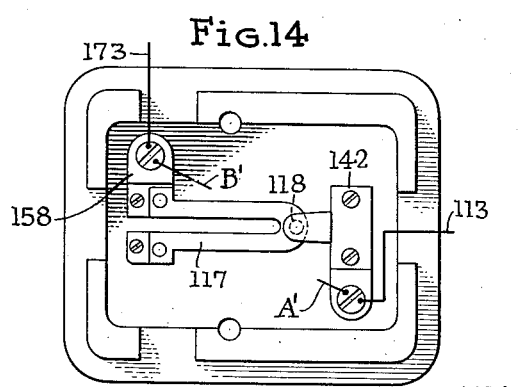
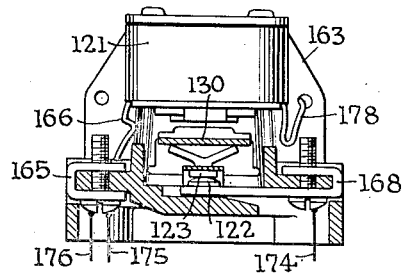
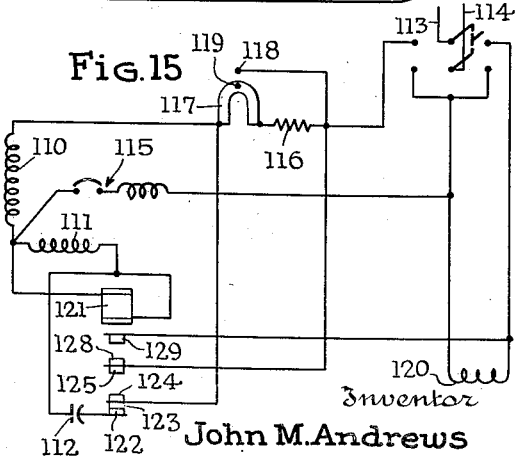
Inventor
John M. Andrews
By Dodge and Son
Attorneys Patented Feb. 19, 1952

2,585,987

UNITED STATES PATENT OFFICE 2,585,987

RELAY TYPE OF CURRENT LIMITER

John M. Andrews, York, Pa., assignor to York Corporation, York, Pa., a corporation of Delaware Application April 11, 1951, Serial No. 220,499

7 Claims. (Cl. 318—102)

This invention relates to motor starters and more particularly to a small unitary construction for use in sequentially starting two or more motors running on the same lines. The present application is a continuation-in-part of applicant's copending application Serial No. 103,129 filed July 5, 1949, now abandoned.

It has become a problem in the operation of air conditioners and other electrical apparatus which makes use of two or more motors to limit the starting current to values which are acceptable to the power companies. This is particularly true where thermostatic controls occasion frequent stopping and starting.

It is an object of the invention to provide a small self-contained control unit which will start two or more motors sequentially and limit the starting current load to a safe value.

Other objects will be apparent from the following description taken in conjunction with the accompanying drawings in which:

Fig. 9 is a side elevation of a modified form of the relay proper.

Fig. 10 is a top view of the relay shown in Fig. 9.

Fig. 11 is a front elevation of the relay shown in Fig. 9.

Fig. 12 is a front elevation partly in section on the line 12—12 of Fig. 10.

Fig. 13 is a side elevation in partial section of the modified form of the complete structure.

Fig. 14 is a top view of that part of the base which contains the thermostat and the current limiting resistor. It is to be noticed that this view is identical with Fig. 7 except that certain of the leads to the structure are different.

Fig. 15 is a schematic wiring diagram showing the modified form of starting device connected in circuit with two motors.

Figure 1:
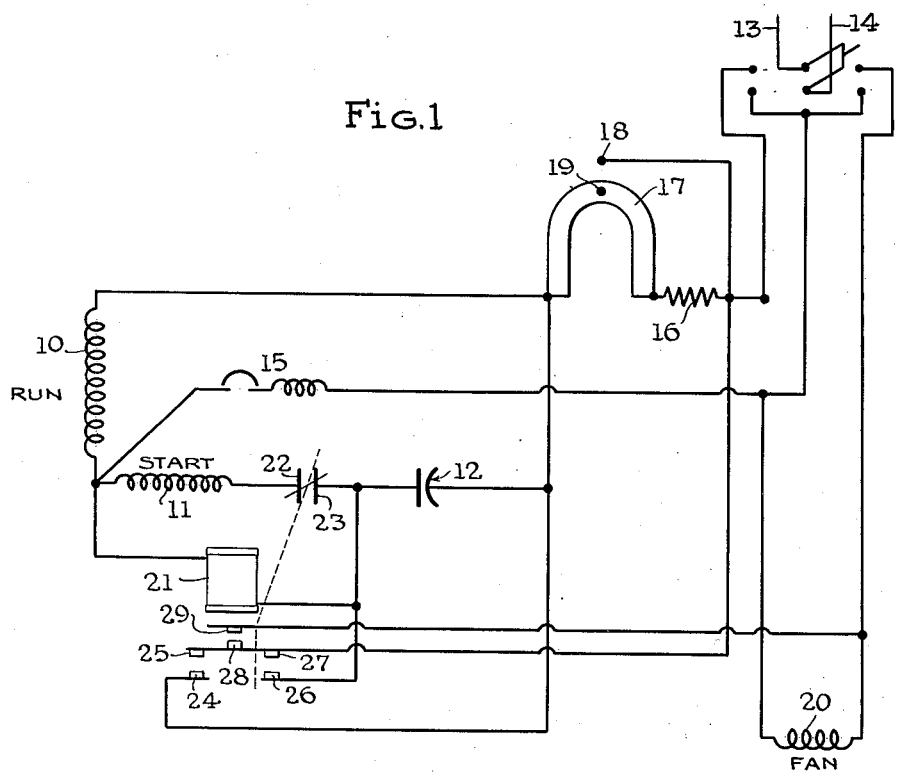
Fig. 1 is a schematic wiring diagram showing the starter of the invention connected in circuit with two motors.

The equipment and its operation are best described with reference to the wiring diagram of Fig. 1. The numerals 10 and 11 respectively are the running and starting windings of an ordinary split-phase type motor. The capacitor 12 is connected in series with the starting winding of the motor to provide sufficient phase displacement for starting torque. The voltage source is indicated by supply lines 13 and 14. An overload relay 15 may be inserted in series with the motor as a safety measure to prevent the windings from burning out in the event of excessive loads or unusual low voltage conditions. Starting current is limited by the use of a small resistor 16 (which in the case of a ¾ horsepower motor may be of the order of 0.75 ohm). A thermostat 17 is placed in series with this resistor and controls a pair of contacts 18 and 19 which are normally open. The purpose of this thermostat is to shunt out the current limiting resistor if the motor fails to come up to speed within a predetermined time. A second motor 20 is shown which may be a fan motor or any other which is to run from the same line as the first motor. The operation of the relay 21 and its associated contacts 22—23, 24—25, 26—27, 28—29, will be apparent from the operation of the circuit which follows here.

With the circuit in its dormant state, relay winding 21 is de-energized and all contacts except 22—23 are open. When power is applied to the circuit from lines 13 and 14 the circuit may be traced from line 14, through the overload device 15, through the running winding 10, the thermostat 17, the current limiting resistor 16 and back to line 13. Power is, therefore, applied at reduced voltage to the running winding. A parallel circuit runs from line 14, through the overload device 15, the starting winding 11, the normally closed contacts 22—23, the capacitor 12, the thermostat 17, the resistor 16 and back to line 13. Power is, therefore, simultaneously applied at reduced voltage to the starting winding 11. Since the current in the latter path is displaced in phase by capacitor 12 from current in the first path, a torque is exerted on the armature of the motor and it begins to revolve.

Relay 21 is connected across the starting winding and is, therefore, subjected to a voltage equal to the applied voltage plus the back E. M. F. generated in the winding. When the motor reaches a predetermined speed, the voltage applied to the starting winding plus the back E. M. F. is sufficient to energize the relay and the following events ensue:

1. Contacts 22—23 open and remove the applied voltage from the starting winding.

2. Contacts 24—25 close and shunt out the thermostat 17 and resistor 16, thus applying full load voltage to the running winding of the motor.

3. Contacts 26—27 close and place the relay 21 across the lines 13 and 14 in order to hold it in energized condition and shunt out condenser 12.

4. Contacts 28—29 close and apply full line voltage to the motor 20.

Thus, the two motors are started in sequence and the starting current load is held to a predetermined limit.

The control device which accomplishes the above circuit operation is shown in detail in Figs. 2–7.

The relay 21 and its associated contacts 22, 23, 24, 25, 26, 27, 28, 29 are shown in Figs. 2 to 5. Contact points 23, 24 and 26 are attached to the movable armature 30. Contacts 24 and 26 are separated electrically from each other by means of an insulating strip 31 attached to the armature. The contact 26 is connected to the armature 30 by means of a lead 56.

The relay unit is mounted on an insulating base 32 and a cover 33 is adapted to fit over and completely enclose the unit. A second insulating base 34 is adapted to be fastened to the relay base 32 and to the cover 33 as, for example, by bolts 35 through openings 36, 37, 38 and 39 in Figs. 3 and 7.

Figure 6:
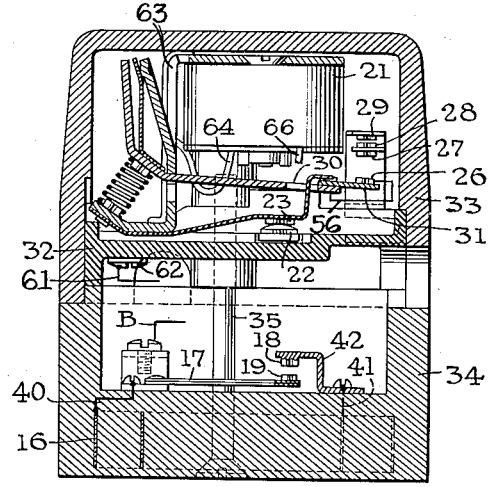
Fig. 6 is a side elevation in partial section of the complete structure.
Figure 7:
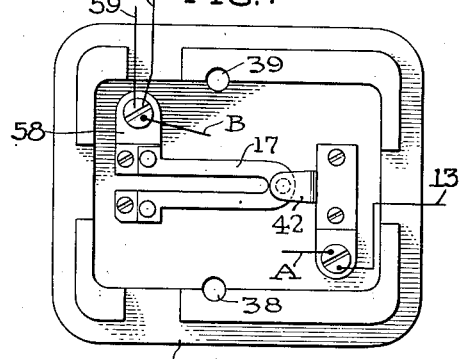
Fig. 7 is a top view of that part of the base which contains the thermostat and current limiting resistor.

The current limiting resistor 16 may be embeded in base member 34 as shown in Fig. 6 and has connections 40 and 41 also embedded to each side of contact points 18 and 19. The thermostat 17 is attached to member 34 and contact 19 is attached to the end of the bi-metallic strip. Contact 18 is supported on a bracket 42 in spaced relation to contact 19.

The control device shown in Figs. 2 through 7 is connected to the motor circuit in the following manner. The line connection 13 is connected to the bracket 42 which supports the contact 18 and which is electrically connected to one end of the resistor 16 by the lead 41. A lead A extends upwardly from the bracket 42 to the terminal post 57 which is electrically connected to the contacts 25, 27 and 28. A lead 59 extends from a post 58 to the running winding 10. A second lead 60 extends from the post 58 which is connected to one end of the bi-metallic element 17 to one side of the capacitor 12. A lead B extends upwardly from the post 58 to the movable contact 24. A lead 61 extends from the other side of the capacitor to the terminal 62 (see Fig. 6), which is connected to the frame 63 which supports the relay and its armature.

One side of the relay 21 is connected to the frame 63 by means of a lead 64 whereby the movable contact 23, one side of the relay coil 21 and the contact 26 are all electrically connected to the same lead 61. The other side of the relay 21 is connected to a terminal plate 65 by means of the lead 66. A lead 67 extends from the terminal plate 65 to one of the motor terminals (see Figs. 1, 3 and 7).

Stationary starting contact 22 is made integrally with the terminal plate 68 which is connected to the other end of the starting coil by a lead 69. A lead 70 extends from the terminal clip 71 to the fan motor 20. The clip 71 is electrically connected to the contact 29.

As herein shown and described, the control device serves to limit the starting current of the first motor only. This will be adequate when the second motor, for example, is driving a fan and is consequently of only very small current rating. However, it will be apparent that where two large motors are to be operated, the control device may be used to start first one and then, as it comes up to speed, will apply line voltage to a second identical control device for the second motor. In this way, the total line load during starting is always held within limits acceptable to the power companies. It will thus be further apparent that a plurality of motors can be started in this fashion.

Figure 8:
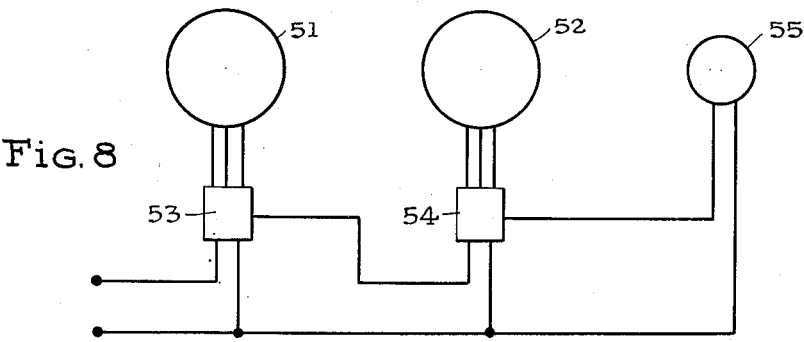
Fig. 8 is a schematic diagram showing application of the control to three motors.
Figure 2:
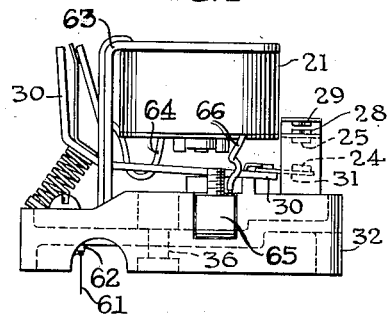
Fig. 2 is a side elevation of the relay proper.
Figure 3:
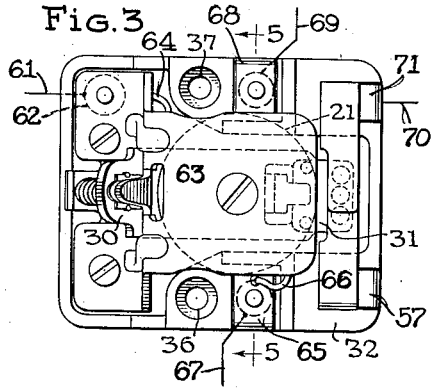
Fig. 3 is a top view of the relay shown in Fig. 2.
Figure 4:
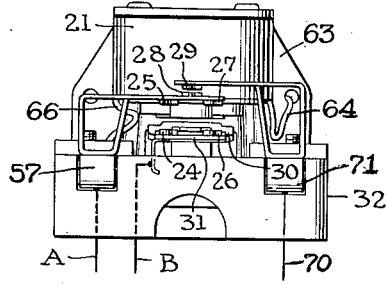
Fig. 4 is a front elevation of the same.
Figure 5:
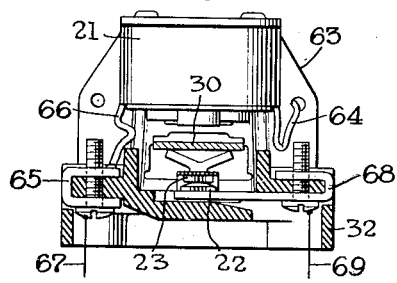
Fig. 5 is a front elevation partially in section on line 5—5 of Fig. 3.

Fig. 8 indicates schematically the application of the principle to two large motors, the starting currents of which are normally above a predetermined limit fixed by the power companies and a third motor the starting current of which is below this limit.

The starting cycles of the two large motors 51 and 52 are each controlled by a control device of either the preferred or the modified form. The control device for the motor 51 is here given the reference numeral 53, and 54 is the control device for the motor 52.

The operation of the system shown in Fig. 8 is as follows: Line voltage is applied to the control device 53 which carries motor 51 through a limited current starting cycle. Then control device 53 applies line voltage to control device 54 which carries motor 52 through a limited current starting cycle. Lastly, control device 54 applies full line voltage to small motor 55.

The control device shown in Figs. 9 through 14 is a simplified form of the control device shown in Figs. 2 through 7 and is adapted to be connected into the circuit in a slightly different manner as shown in Fig. 15.

The operation of this form of the device will be best understood by consideration of Fig. 15 which shows the wiring diagram. The numerals 110 and 111 indicate respectively the running and starting windings of an ordinary split phase type motor. The voltage source is indicated by supply lines 113 and 114. An overload relay 115 may be inserted in series with the motor to prevent possible burning out of the windings under conditions of excessive load or unusual low voltage conditions.

The starting current to the motor is limited by the use of a small resistor 116. A thermostat 117 is placed in series with this resistor and controls a pair of contacts 118 and 119 which are normally open. The purpose of this thermostat 117 is to shunt out the resistor 116 in the event the motor fails to come up to speed within a predetermined time interval. A second motor 120 is shown and is arranged to be connected to the same power source after the above mentioned motor has come up to speed. These sequential starting and current limiting functions are both controlled by means of a relay 121 which is adapted to be connected in parallel with the starting winding 111.

This relay 121 controls contacts 122, 123, 124, 125 and 128, 129. It will be noticed that the contacts 122 and 123 are differently located than the contacts 22, 23 in the starting circuit shown in Fig. 1.

In the circuit shown in Fig. 15 the starting contacts 122, 123, which are normally closed, are arranged to disconnect the starting winding from the power source but do not interrupt the circuit common to the relay 121 and to the starting coil 111.

The operation of the device in the circuit shown in Fig. 15 is essentially the same, as in the circuit shown in Fig. 1. When the main switch is closed, current is supplied to the running winding 110 through the overload protection device 115 and returns to the line 113 through thermostatic element 117 and the resistor 116. The starting winding 111 which is connected in parallel with the running winding 110 is also supplied with current which flows therethrough to the capacitor 112 through contacts 122, 123 and back to the thermostatic element 117. It will be seen that the relay 121 is subject to the voltage drop across the starting winding 111 and to the back E. M. F. generated in this winding.

When the motor reaches a certain predetermined speed, this voltage will reach a value such that the relay 121 will be energized, thus opening the contacts 122, 123 and closing the contacts 124, 125 and 128, 129. The opening of contacts 122, 123 disconnects the starting winding 111 from the power lines 113 and 114. Relay 121 is maintained in the energized condition by the voltage which is induced in the starting winding 111. The closure of contacts 124, 125 operates to shunt out the resistor 116, thus applying full line voltage to the running winding 110. Closure of contacts 128, 129 connects the fan motor 120 across the power lines 113 and 114.

From the above description it will be seen that the control function of the modified form of the starting device is identical with the control function of the form of the device shown in Figs. 2 through 7. However, in the modified form, the relay 121 is not connected to line voltage after it has once become energized and closed the normally open contacts. Instead it is maintained energized by the induced voltage in the starting winding.

The form shown in Figs. 2 through 7 is preferred. The reason for this is that the induced voltage may be reduced below the value necessary to maintain the relay 121 energized under conditions of heavy load, thus permitting it to drop its contacts. However, a commercial form of the device embodying the modified form, shown in Figs. 9 through 15, of the device has been used and has proved satisfactory in service. The function of the thermostatic element is precisely the same in each form of the control device, i. e. it operates to short out the resistor in event the motor fails to come up to speed within a predetermined time.

The modified form of the control device is adapted to be connected in the circuit in the following manner: Line 113 is connected to the bracket 142 which carries the contact 118. A lead 141 extends between the bracket 142 and one end of the resistor 116. The opposite end of resistor 116 is connected to the thermostatic element 117 by a lead 140. A lead B' extends from the terminal 158 upward to the frame 163 which carries the relay 121. The contacts 123 and 124 are electrically connected to this frame through the member 130 and a flexible wire 172. A lead 173 extends from the bracket 158 to running winding 110. A lead 174 extends from one side of the capacitor 112 to the terminal connection 168 which is electrically connected to the contact 122.

A lead 175 extends from the other side of the capacitor 112 to the terminal 165. Leads 166 and 176 lead from the terminal 165 respectively to one side of the relay 121 and to the starting winding 111. The other side of the relay 121 is connected to terminal 177 by a lead 178. The terminal 177 and lead 178 are insulated from the frame 163 by an insulating bushing 179. A lead 180 extends from the terminal 177 to the starting and running windings.

A lead A' extends from the bracket 142 to the terminal 157 which is electrically connected to the contacts 125 and 128. A lead 170 extends from terminal 171 to one of the fan motor terminals.

I claim:

1. A unitary control device for use in connection with a motor having a starting winding and serving to limit the starting current load, said device comprising in combination, an electromagnetic relay adapted to be connected across said starting winding to subject it to the voltage across said winding; an insulating base structure for said relay; an electrical resistor embedded in said base and adapted to be connected in series with said motor; a thermostat mounted on said base connected in series with said resistor and adapted to short out said resistor if said motor fails to come up to speed within a predetermined time; a pair of contacts actuated by said relay normally closed and adapted when opened to disconnect said starting winding from the voltage supply to the motor; and a second pair of contacts actuated by said relay normally opened and adapted when closed to short out said resistor whereby said motor may be started through said resistor until the voltage across said starting winding reaches a predetermined value to operate said relay which then disconnects the starting winding from the voltage supply to the motor and shunts out the starting resistor independently of the operation of said thermostat.

2. A unitary control device for use in connection with a motor having a starting winding and serving to limit the starting current load, said device comprising in combination, an electromagnetic relay adapted to be connected across said starting winding to subject it to the back E. M. F. of said winding; an insulating base structure for said relay; an electrical resistor embedded in said base and adapted to be connected in series with said motor; a thermostat mounted on said base connected in series with said resistor and adapted to short out said resistor if said motor fails to come up to speed within a predetermined time; a pair of contacts actuated by said relay normally closed and adapted when opened to de-energize the starting winding of said motor and a second pair of contacts actuated by said relay normally opened and adapted when closed to short out said resistor, whereby said motor may be started through said resistor until the back E. M. F. of the starting winding reaches a predetermined value to operate said relay which then de-energizes the starting winding and shunts out the starting resistor independently of the operation of said thermostat.

3. A unitary control device for use in sequentially starting a plurality of electric motors and for limiting the starting current load imposed by at least the first of said motors, said first motor having a starting winding, said device comprising an electro-magnetic relay adapted to be connected in parallel with said starting winding to subject it to the back E. M. F. of said winding; an insulating base structure for said relay; an electrical resistor adapted to be connected in series with said first motor; a thermostat connected in series with said resistor and adapted to short out said resistor only if said first motor fails to come up to speed after a predetermined time, said resistor and said thermostat also being carried by said base structure; a first pair of contacts actuated by said relay, said contacts being normally closed and adapted when opened to deenergize the starting winding of said first motor and disconnect said relay therefrom; a second pair of contacts actuated by said relay normally opened and adapted to short out said resistor when closed and a third pair of contacts actuated by said relay normally opened and adapted to close the circuit to a second motor, whereby said first motor may be started through said resistor until the back E. M. F. of the starting winding reaches a predetermined value sufficient to energize said relay thus opening said first pair of contacts, closing said second pair of contacts to shunt out the starting resistor, independently of the operation of said thermostat, and closing said third pair of contacts.

4. Control means for use in connection with a motor having a starting winding and serving to limit the starting current load, said means comprising in combination an electro-magnetic relay connected across said starting winding and subject to the back E. M. F. of said winding; a resistor connected in series with said motor; a thermostat connected in series with said resistor and effective to shunt said resistor if said motor fails to come up to speed within a predetermined time; a pair of normally closed contacts actuated by said relay and adapted when opened to de-energize the starting winding of said motor and a second pair of contacts, normally opened, actuated by said relay and adapted when closed to short out said resistor whereby said motor may be started through said resistor until the back E. M. F. of the starting winding reaches a predetermined value at which time said relay operates to open said pair of normally closed contacts and close said second pair of contacts.

5. Control means for sequentially starting two motors the first of said motors having a starting winding and serving to limit the starting current load drawn by said first motor, said means comprising in combination, an electro-magnetic relay connected across said starting winding and subject to the back E. M. F. of said winding; a resistor connected in series with said first motor; a thermostat connected in series with said resistor and effective to shunt said resistor if said first motor fails to come up to speed within a predetermined time; a pair of normally closed contacts actuated by said relay and adapted when opened to de-energize the starting winding of said first motor, a second pair of contacts, normally opened, actuated by said relay and adapted when closed to short out said resistor and a third pair of contacts, normally opened, and effective when closed to complete a circuit through said second motor whereby said first motor may be started through said resistor until the back E. M. F. of the starting winding reaches a predetermined value at which time said relay operates to open said pair of normally closed contacts and close said second and third pairs of contacts.

6. A unitary control device for use in sequentially starting a plurality of electric motors at least one of which has a starting winding and limiting the starting current load, comprising in combination, an electro-magnetic relay adapted to be connected across the starting winding of a first motor to subject it to the back E. M. F. of said winding; an insulating base structure for said relay; an electrical resistor embedded in said base and adapted to be connected in series with a first motor; a thermostat mounted on said base connected in series with said resistor and adapted to short out said resistor if the first motor fails to come up to speed after a predetermined time; a first pair of contacts actuated by said relay, normally closed and adapted to de-energize the starting winding of the first motor and disconnect said relay therefrom; a second pair of contacts actuated by said relay, normally opened and adapted to short out said resistor; a third pair of contacts, actuated by said relay, normally opened and adapted to place said relay across the voltage supply to the motor; and a fourth pair of contacts actuated by said relay, normally opened, and adapted to close the circuit to second motor, whereby a first motor may be started through said resistor until the back E. M. F. of the starting winding reaches a predetermined value to operated said relay, which then cuts out the starting winding, places the relay on the line voltage, shunts out the starting resistor and closes the circuit to a second motor.

7. A unitary control device for use in sequentially starting a plurality of electric motors at least one of which has a starting winding and limiting the starting current load comprising in combination, an electrical relay adapted to be connected in parallel with the starting winding of a first motor to subject it to the back E. M. F. of said winding while said motor is coming up to speed and to the induced voltage in said winding when said motor is running normally; an insulating base structure for said relay; an electrical resistor embedded in said base and adapted to be connected in series with said first motor; a thermostat mounted on said base coonnected in series with said resistor and adapted to short out said resistor if said motor fails to come up to speed after a predetermined time; a first pair of contacts normally opened actuated by said relay and adapted to disconnect the starting winding of the first motor from the voltage supply to the motor; a second pair of contacts actuated by said relay normally opened and adapted to short out said resistor; a third pair of contacts normally opened actuated by said relay and adapted to close the circuit to a second motor whereby the first motor may be started through said resistor until the back E. M. F. of said starting winding reaches a predetermined value to operate said relay which then disconnects the starting winding from the voltage supply to the motor leaving the relay subject to the induced voltage in the starting winding, shorts out the resistor and closes the circuit to a second motor.

JOHN M. ANDREWS.

REFERENCES CITED

The following references are of record in the file of this patent:

UNITED STATES PATENTS

| Number | Name | Date |
| --- | --- | --- |
| 1,944,090 | Lukens | Jan. 16, 1934 |
| 1,953,941 | Anderson | Apr. 10, 1934 |
| 1,964,581 | Janca, Jr. | June 26, 1934 |
| 2,158,887 | Sweet | May 16, 1939 |
| 2,247,073 | Thompson | June 24, 1941 |
| 2,299,669 | Werner | Oct. 20, 1942 |
| 2,311,048 | Harrold | Feb. 16, 1943 |
| 2,447,675 | Walley | Aug. 24, 1948 |